March 12, 1940. F. H. REHSE 2,193,490
ELECTRIC WELDING APPARATUS
Filed Aug. 13, 1936 7 Sheets-Sheet 1

Inventor
Frank H. Rehse

Inventor
Frank H. Rehse

March 12, 1940.   F. H. REHSE   2,193,490
ELECTRIC WELDING APPARATUS
Filed Aug. 13, 1936   7 Sheets-Sheet 5

Inventor
Frank H. Rehse.

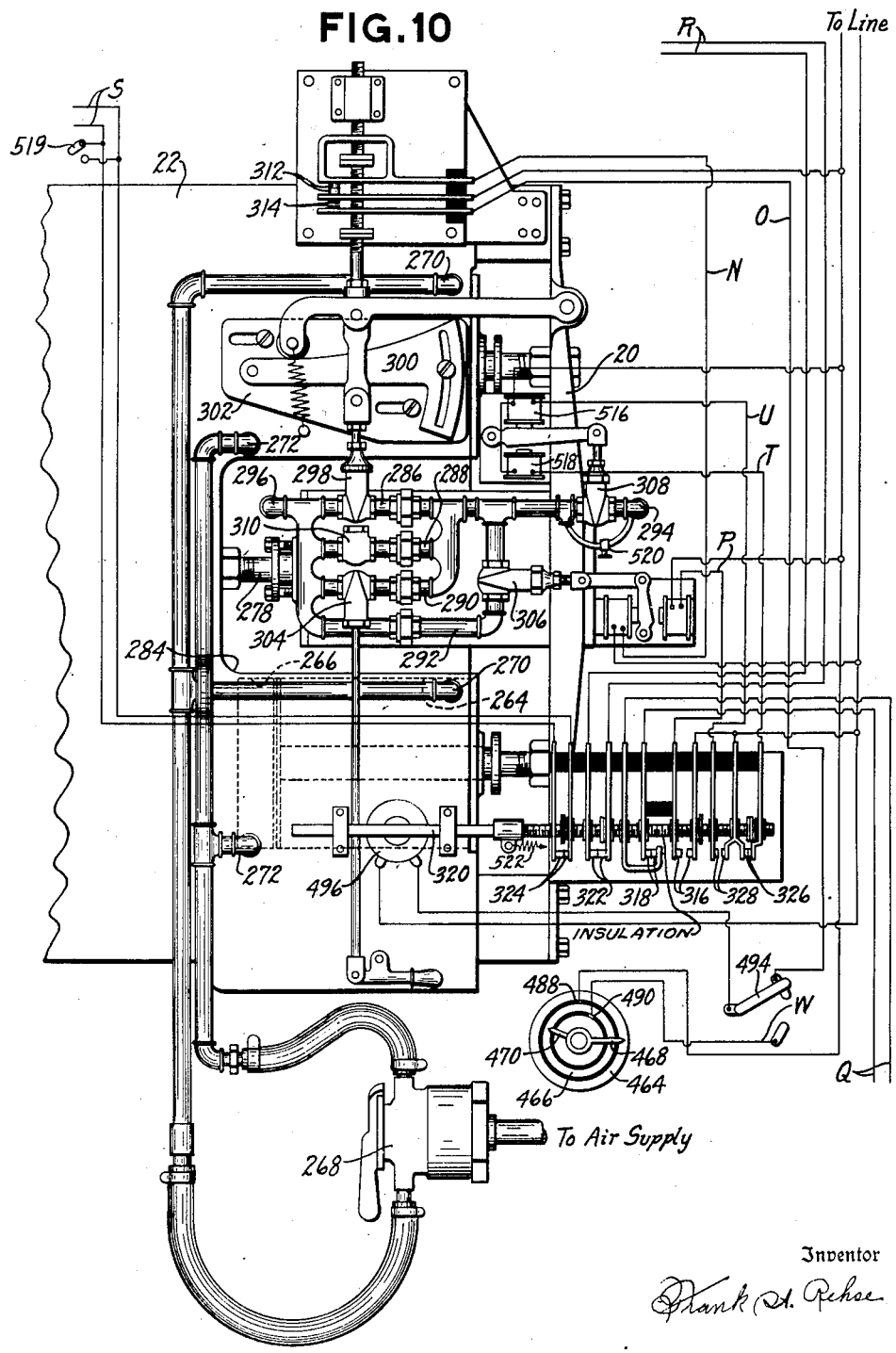

Patented Mar. 12, 1940

2,193,490

UNITED STATES PATENT OFFICE 2,193,490

ELECTRIC WELDING APPARATUS

Frank H. Rehse, Dayton, Ohio, assignor of one-fifth to Max Isaacson, Dayton, Ohio Application August 13, 1936, Serial No. 95,776

51 Claims. (Cl. 219—4)

This invention relates to electric welding machines and a method of butt welding.

An object of my invention is to provide an improved method of uniting of cast iron pipe sections by electric resistance butt welding.

Another object of my invention is to provide, in an electric resistance welding apparatus in which the work pieces are moved towards each other for effecting the weld, a novel means for relatively shifting the work pieces angularly with respect to each other about axes lying in the plane of their approaching movement for obtaining and maintaining parallelism of the abutting surfaces during such approaching movement and to force grain growth of the weld metal when united.

A further object of my invention is to provide in a welding apparatus of this character and in which means are provided for accomplishing relative angular displacement of the work pieces about axes lying in the plane of their approaching movement, regulating means for controlling the rate of angular displacement.

A still further object of my invention is to provide, in an electric resistance welding apparatus in which the work pieces are brought together and held in electrical contact for preheating, means for changing the position of work pieces simultaneously together relative to the source of potential of the electrical circuit including the work whereby the current flow through the contacting areas of the work will be substantially uniformly distributed.

Still another object of my invention is to provide in an electric resistance welding apparatus of this character a pair of work supporting electrode heads that are provided with centralizing means for symmetrically positioning the work pieces in order to obtain substantially uniform metal alignment of the external surface whereby eccentric weld joints are avoided.

Another object of my invention is to provide in an apparatus of this character means for conveying individual or jointed pipe sections through the electrode supporting heads and to automatically position the trailing end thereof at substantially midway between the electrode heads.

A further object of this invention is to provide in an apparatus of this character a means that is responsive to the movement of the work as it is passed through one of the electrode heads for predeterminately positioning the same relative to the other.

Another object of my invention is to provide in an electric resistance welding machine in which the electrodes are relatively movable with respect to the source of potential a more efficient current transmission line between the electrodes and the poles of the secondary. This has been accomplished by providing fluid current contact or contacts directly connecting either or both the electrodes to the poles of the secondary winding.

A further object of my invention is to provide a novel means for controlling the operation of the welding apparatus in accordance with a predetermined setting for obtaining a predetermined length of welded pipe sections.

Another object of my invention is to provide an electric resistance welding machine in which the electrodes are relatively movable with respect to the source of potential partially submerged and mounted for rotation within liquid contact that electrically connects the electrodes directly to the poles of the secondary winding to reduce to a minimum the overall resistance of the secondary circuit thereby reducing the current consumption of the welding apparatus.

Another object of my invention is to provide an electric resistance welding machine in which the electrodes are partially submerged in liquid contacts for directly connecting the same to the poles of the secondary winding and are capable of relative movement with respect to each other in a helical path or in a longitudinal plane.

In the drawings:

Fig. 10 is a detail plan view of certain of the parts of the right hand side of the machine together with certain other of the electrical circuits of the machine;

Fig. 11 is an enlarged detail view;

Fig. 12 is a section taken on the line 12—12 of Fig. 11;

Figure 13:
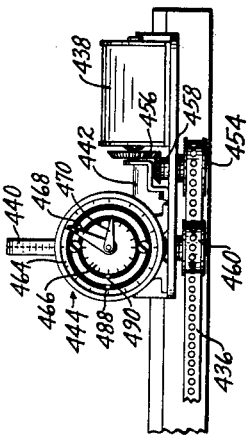
Fig. 13 is a front elevational detail view removed from Fig. 1 but shown in Fig. 2.
Figure 15:
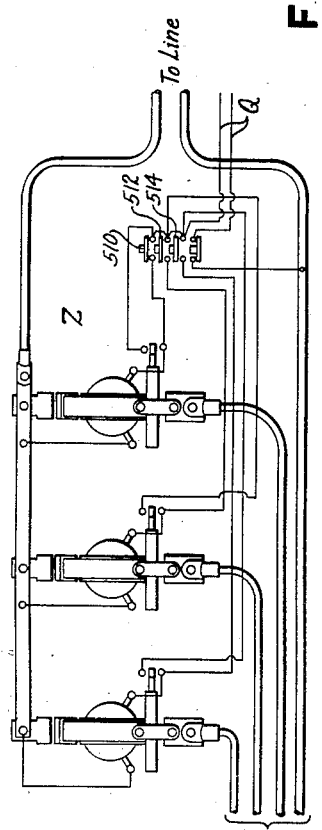
Fig. 15 is a diagrammatic view of a power supply circuit.
Figure 1:
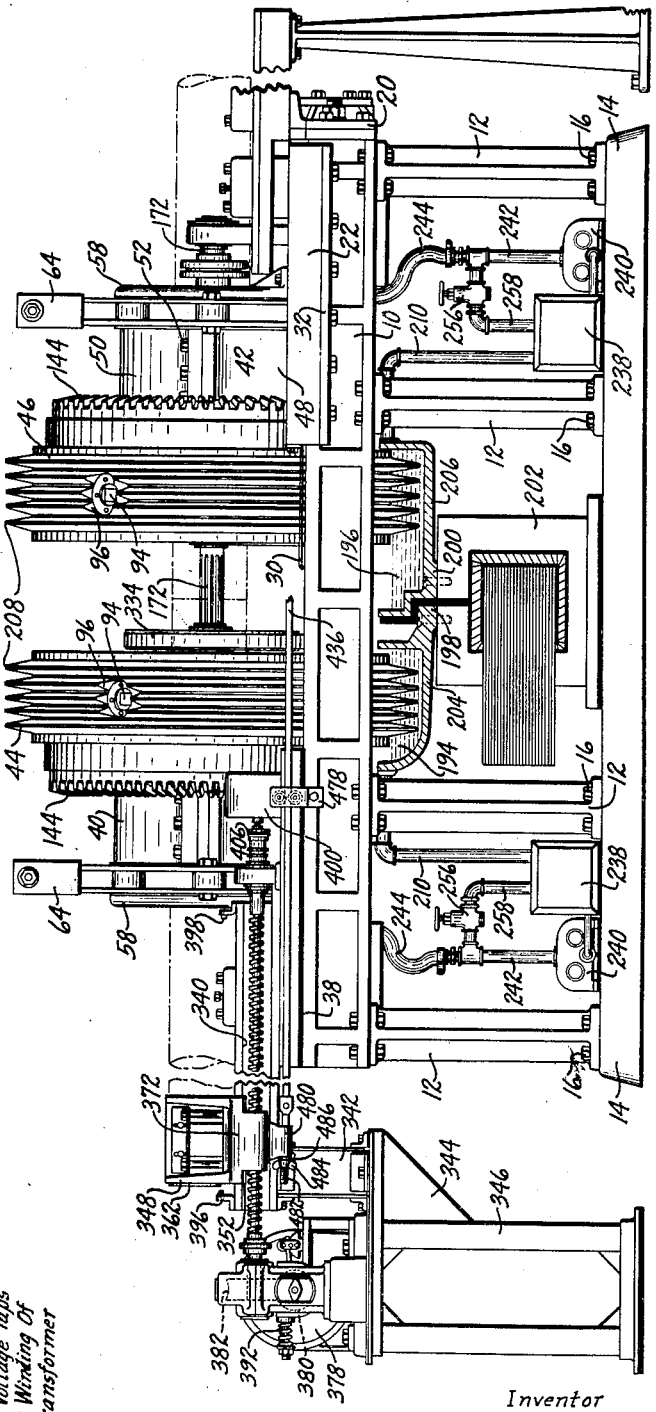
Fig. 1 is a front elevational view of an electric resistance welding machine embodying the features of my invention, portions of the machine at the right and left hand sides being broken away.

Referring to Figs. 1 to 6, the welding apparatus as illustrated includes a bed plate 10 mounted upon and connected to the upper ends of columns 12 that are arranged on opposite sides of a base plate 14 and connected thereto at their lower ends by means of bolts 16. The rails of the bed plate are connected together at one end by a fixed table 18 and at the other end by a cross member or yoke 20. The cross member or yoke 20 serves as a support for the fixed parts of devices for actuating, controlling and regulating the movements of the movable electrode head hereinafter described more in detail.

A movable table 22 is slideably supported on the rails 24 at the feeding end of the welding apparatus. To facilitate the sliding movement of the movable table 22, each rail is formed with a planer way 26 that is adapted to receive complemental V-shaped projections 28 made integral with the table at opposite sides thereof. The length of planer ways 26 will permit the maximum allowable travel of the electrode head. The portions of the planer ways that extend beyond the inner end of the table are shielded against foreign substances, such as the flash metal, by means of shields 30 connected by suitable means to the end of the table. Vertical displacement of the movable table from the rail is prevented by means of gibs 32 attached to depending flanges 34 on opposite sides of the table and extending beneath and in contact with laterally projecting flanges 36 made integral with the rails.

The fixed table 18 at the discharge end of the welding apparatus is detachably connected to and insulated from the rails by strips of insulation 38 that are received in the recessed upper surfaces of the rails. Shims (not shown) may be inserted between the table and the insulation 38 for obtaining relative vertical adjustment of the fixed and movable tables. The tables 18, 22 are respectively provided with journals 40, 42 at the inner ends thereof for rotatably supporting a pair of electrode heads 44, 46 respectively. Each journal consists of a bearing support 48 cast integral with the table and a cap 50 detachably connected to the bearing support by means of bolts 52.

The electrode heads, illustrated herein, are identical in construction and a description of one should therefore suffice for both.

Figure 7:
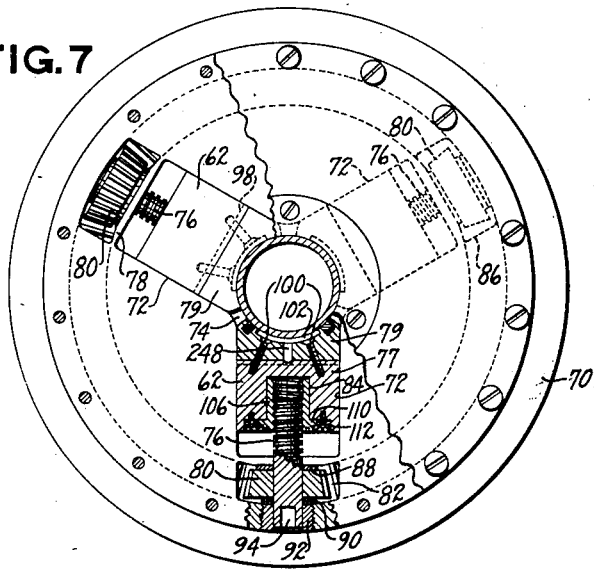
Fig. 7 is an end view of the work support shown in Fig. 6.
Figure 8:
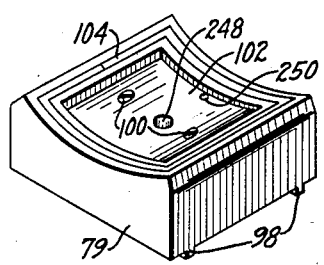
Fig. 8 is a detail view shown in perspective.
Figure 4:
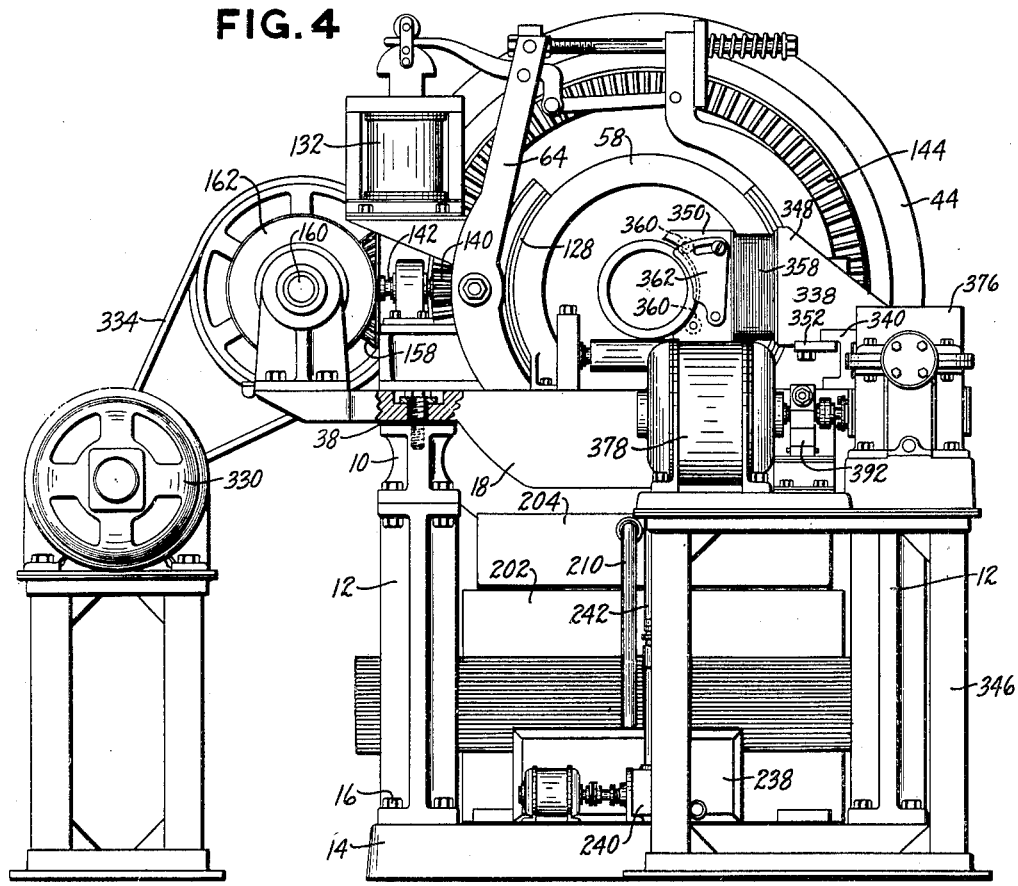
Fig. 4 is an end view of the machine shown in Fig. 1 looking from left to right.
Figure 5:
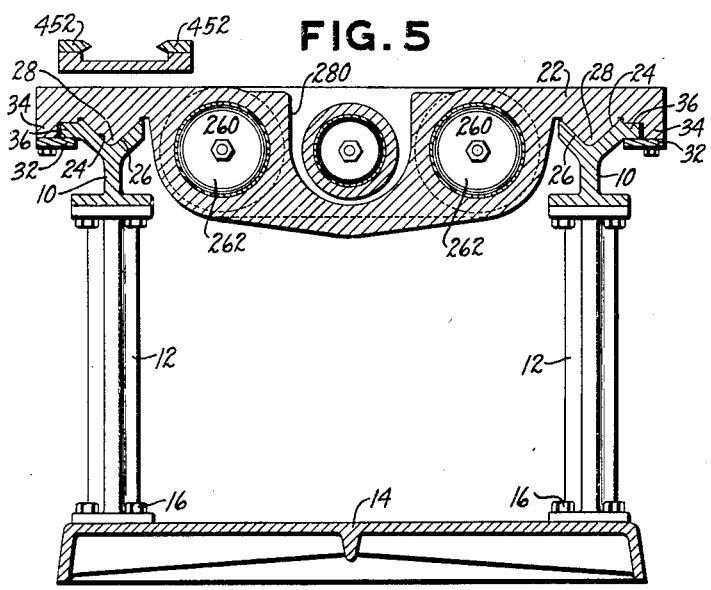
Fig. 5 is a view taken on the line 5—5 of Fig. 2.
Figure 14:
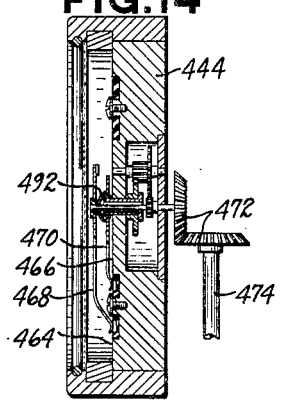
Fig. 14 is an enlarged sectional view of the indicator shown in Fig. 13.
Figure 6:
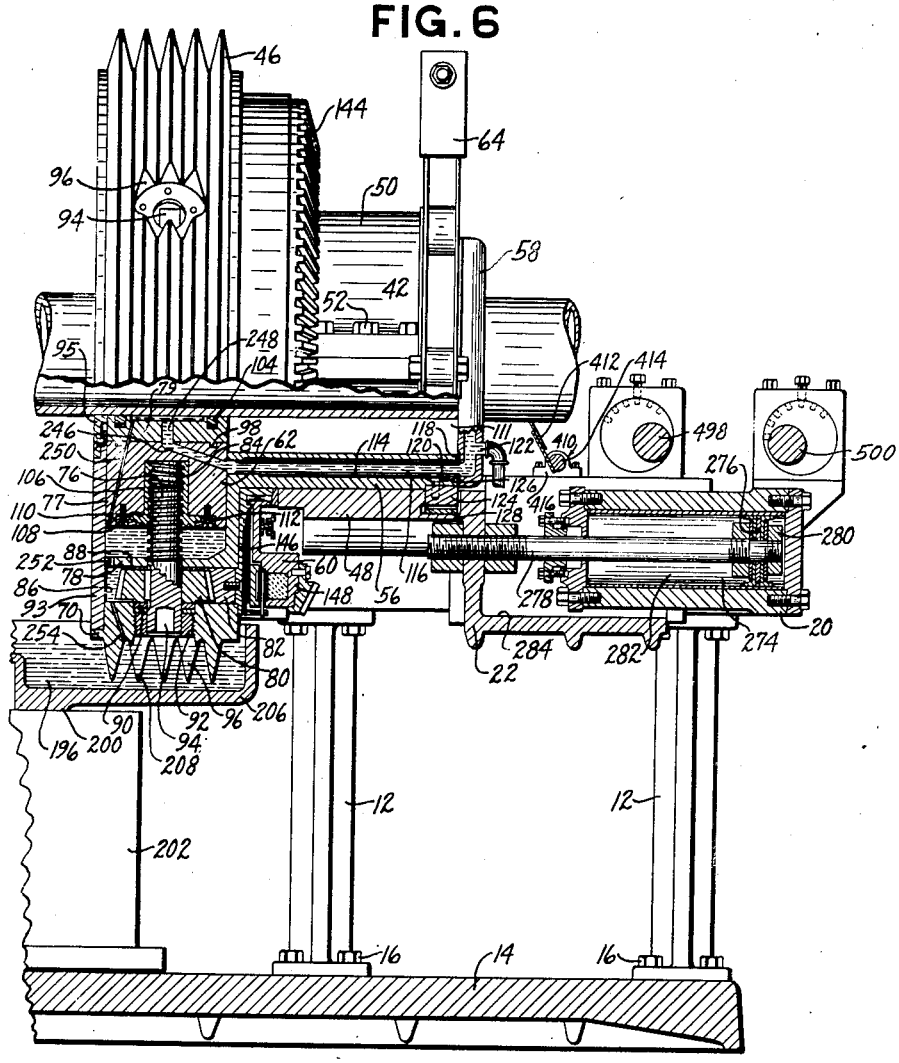
Fig. 6 is a longitudinal sectional detail view of the right hand side of the machine with parts broken away and removed.
Figure 9:
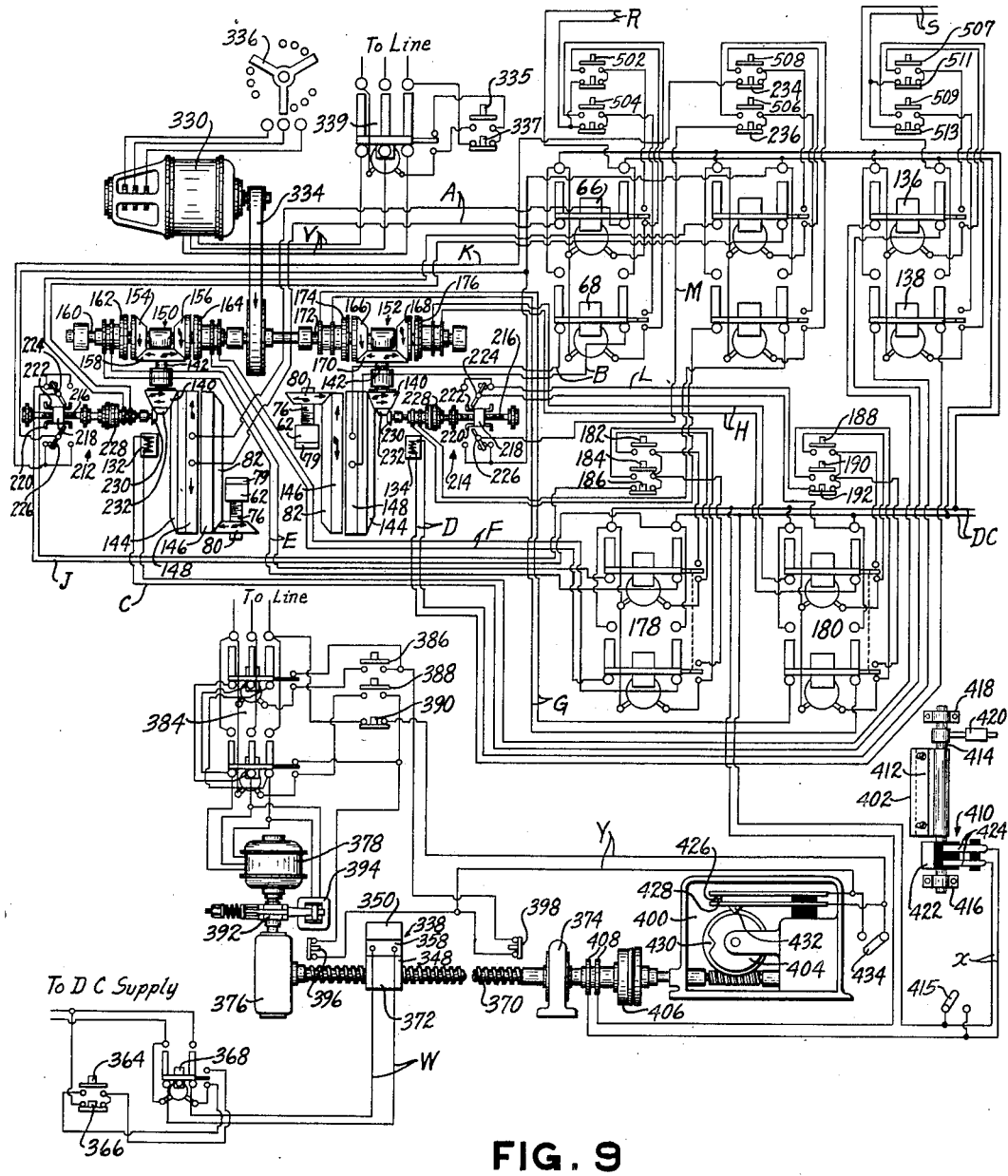
Fig. 9 is a diagrammatic view of certain of the electrical circuits and their respective cooperating mechanical parts of the electric resistance welding machine.

The electrode head 46, best shown in Figures 6, 7 and 8, comprises a work-supporting and work-electric contacting device provided with a plurality of radially movable electrodes or electrode segments; a spindle 56 which serves to rotatably support the same on the journal bearing 42 and cooperates with a manifold 58 for distributing a current conducting liquid to the electrodes and a magnetic clutch 60 for coupling said device to a selective transmission mechanism, hereinafter described more in particular, to rotate the same through the electrodes, upon release of a suitable locking device, such as a magnetic brake 64 that releasably locks the electrode head in fixed relation to the table, and after a predeterminately adjusted limited contracting movement of said electrode segments. The magnetic clutches 60 of the electrode heads 44, 46 are respectively energized and deenergized by electrical circuits A and B respectively, as shown in Fig. 9, each circuit being controlled by push buttons through two pole magnetic switches 66, 68 respectively.

The work-supporting and electric contacting device consists of a housing 70 formed from suitable electric current conducting metal, such as a copper or bronze casting and provided with radially arranged guiding slots 72 intersecting in a central axial bore 74. The slots are equi-angularly disposed and equal in extent dividing the inner portion of the housing into three equal segments. The guiding slots have disposed therein slideably movable electrode segments 62 that are operatively connected to a common drive for simultaneously actuating the same to clamp or release the work. For this purpose each electrode segment, which comprises a carrier 77 and a work engaging insert 79, is provided with a driving screw 76, one end of which extends thru a partition 78 and has fixedly mounted thereon a pinion 80 that meshes with a beveled ring gear 82 and the other end of which is threadedly engaged with the carrier 77 through an adjusting sleeve 84. The pinions 80 are disposed within recesses 86 and proper gear alignment thereof and of the beveled ring gear 82 is obtained by the provision of a washer 88 between the partition 78 and one face of the gear and a capillary thrust bearing 90 interposed between the other face of the pinion and a threaded retaining collar 92 which serves as a bearing for the outer end of the threaded shaft. The driving screws 76 are each formed with wrench sockets 94. Any one of these screws may be manually actuated by passing a tool through a corresponding opening 96 in the housing 70 in order to simultaneously contract or expand all of the electrode segments of one head.

The electrode inserts 79 that form a throat through which the tube end to be welded extends are splined to the inner end of the sliding carrier by keys 98 and detachably connected by screws 100. These inserts have their tube contacting surfaces formed with troughs 102 which in operation of the welding apparatus are kept filled with a current conducting liquid for effecting intimate contact between the corresponding contacting surfaces of the tube and the electrode inserts. The edges of the electrodes are provided with resilient gaskets 104 that prevent the escape of the liquid from the troughs 102.

Individual adjustment of the electrode segments 62 relative to one another in order to obtain dead-centering thereof is accomplished by rotating the threaded sleeve 84 within the bore 106 formed in the electrode carrier. This sleeve is provided with a flange 108 disposed between the seat of a counter bore 110 and the flange on a locking collar 112. In order to adjust the threaded sleeve 84 the locking collar is loosened from its seat permitting rotation of the sleeve thus effecting relative movement of the carrier 77 and the driving screw 76. After adjustment is completed, the clamp is tightened against the flange and held in place by means of cap screws.

Because of the fact that it is desirable, at times, to rotate both electrode heads in the same direction it is necessary to make one set of driving screws 76 of one head a right hand thread and the other set of the other head a left hand thread, so that rotation of said head ring gears, in the same direction, will clamp the work and drive the heads. It will be seen that with a left hand thread for the right hand head and a right hand thread for the left hand head both heads will rotate in a clockwise direction looking from right to left in Fig. 2.

In assembling the individual adjustable electrodes, the beveled pinions are first inserted into the recesses 86 with the washer 88, and the threaded shafts are passed through an opening in the projection, the central bore in the beveled pinion and through the washer 88. The bearing 90 and retaining collar 92 are then passed over the outer end of the threaded shaft retaining the pinion in place. The carriers and inserts are then threaded onto the bushing and the threaded bushing is then adjusted relative to the carrier and shaft and clamped to the carrier. To accommodate tubing of different diameters different sizes of inserts are utilized and the resilient gaskets 104 accommodate irregularities in the pipe surfaces.

A cover plate 93 is provided at the front of the electrode head and serves as a guiding wall for the electrode segments. This plate serves also as a conductor of the current and it is provided with a central opening sufficiently large to permit any size pipe that the machine is capable of welding, the opening being variable in diameter by the provision of a detachable collar 95 with appropriate opening for the size of the tube. The collar also serves as a means for preventing the entrance into the head of flying particles of flashed off metal from the weld, thereby preventing damage to the inner working parts.

Each spindle 56 is made integral with its corresponding electrode housing 70 and is formed with longitudinal bore 111 of a diameter large enough to freely receive the maximum size pipe sections to be welded. The wall thickness of the spindles is such as will permit the forming of three bores 114 to receive and carry three conduits 116 that connect the troughs 102 with the trunnion type manifold 58. The bore 111 of the spindle and the bore 74 of the housing are co-axially arranged. The spindle is rotatably seated against metallic gaskets 118, 120 received within an annular recess in the manifold which serves to distribute the current conducting liquid through the conduits 116 registering with the continuous port 122 and to the troughs 102 in any position of the electrode head. The gaskets 118, 120 serve to prevent leakage of the conducting liquid.

As previously noted each electrode head is provided with means for releasably locking the same against rotation in the bearing. In one form of my invention and as illustrated herein, an electro-magnetic brake of the "Cutler-Hammer" type is provided for this purpose and, as shown, consists of friction ring 124 that is closely fitted on and fixedly secured to a reduced portion 126 at the outer end of the spindle and a pair of brake shoes 128 that are expanded electro-magnetically and contracted by means of a spring 130 in a manner well known to the art.

The brake solenoids 132, 134 are respectively energized and deenergized by means of electrical circuits C and D as shown in Fig. 9, each circuit being controlled by push buttons through two pole magnetic switches 136, 138 respectively.

The ring-gear 82 of each electrode head is rotated relative to the electrode housing for contracting or expanding the movable electrode segments by means of a beveled gear 140 that is mounted on a shaft 142 and in mesh with a beveled gear ring 144. The beveled gear is connected to the ring-gear 82 through the magnetic-clutch device 60 of the "Cutler-Hammer" type the armature or driven member 146 of which is freely rotatably mounted on the spindle 56 and the field member or driving member 148 is in turn freely mounted on the driven member. Alternatively, the ring-gear 82 coupled to the bevel gear through the clutch device serves to contract and expand the electrodes when the electrode head is locked to the table by the magnetic brake or to rotate the electrode head relative to the journal when the brake device is released and after the electrode segments are fully contracted.

The electrode heads 44, 46 have associated therewith a pair of reversible driving devices 150, 152 for actuating in opposite directions the corresponding expanding and contracting electrode devices and for rotating the heads in opposite directions when the magnetic brake 64 is released and after the electrode segments have moved to the limit of their travel for clamping the work.

The reversible driving device 150 consists of a pair of driving gears 154, 156 that are in continuous mesh with a driven beveled gear 158 and freely rotatably mounted upon a shaft 160. A pair of magnetic clutches 162, 164 of well known construction such as the "Cutler-Hammer" type are mounted on the shaft 160 and associated with the beveled gears 154, 156 respectively for selective engagement therewith. Likewise the driving device 152 consists of a pair of driving beveled gears 166, 168 that are in continuous mesh with a driven beveled gear 170 and freely rotatably mounted upon a shaft 172. A pair of magnetic clutches 174, 176 identical to the clutches 162, 164 are mounted on the shaft 172 and are associated with the beveled gears 166, 168 for selective engagement therewith.

The energizing circuits E, F for the magnetic clutches 162, 164 are mechanically interlocked by means of a two-circuit two-pole magnetic switch 178 of well known construction to prevent simultaneous excitation of the fields of both clutches 162, 164 at the same time. Similarly the energizing circuits G, H are mechanically interlocked by means of a similar switch 180 to also prevent simultaneous excitation of the fields of both clutches 174, 176. Push buttons 182, 184 are provided for controlling excitation of the fields of the clutches 162, 164 respectively and a push button 186 interrupts either of the circuits E, F. Likewise push buttons 188, 190 control the excitation of circuits G, H and push button 192 interrupts either thereof.

The extent of movement of the electrode segments 62 of each electrode is kept at a constant value regardless of the size of the pipe sections being welded by dimensioning the inserts 79 so that the overall dimension of the inserts and pipe in the direction of movement of the segments is the same regardless of pipe size. This makes possible the utilization of means for automatically limiting the travel of the electrode segments in either direction for contracting or expanding the same for clamping or releasing of the work. For this purpose travel limit switches 212, 214 are associated with the reversible driving devices 150, 152 respectively, in such a manner that after a predetermined movement of the electrode segments in either direction, the clutch or clutches in operation of the reversible driving devices will be deenergized to prevent further movement of the electrode segments and thereby avoid possible damage of either the work or the moving parts. As illustrated each of the limit switches 212, 214 is of the two-circuit snap action momentary break type and they respectively consist of a driving screw 216 and an insulated traveling nut 218 with attached switch tripping dogs 220, 222 for actuating snap action switches 224, 226 at predetermined intervals of travel corresponding to the travel of the electrode segments in opposite directions. The driving screws 216 are coupled to the reversible drives 150, 152 through magnetic clutches 228 and beveled pinions 230 in mesh with corresponding beveled gears 232 fixedly connected to the end faces of the corresponding bevel gears 140. The travel limit switch 212 controls circuits J, K, the circuit J being connected to the stop push button 186 so that momentary interruptions of trip switch 224 will deenergize whichever of the two clutches 162, 164 are operating, whereas the circuit K is connected in series with a stop push button 234 for deenergizing and disconnecting the clutch 228. The travel limit switch 214 on the other hand controls circuit L, M, the circuit L being connected in series with stop push button 192 so that momentary interruptions of trip switch 224 will deenergize whichever one of the clutches 174, 176 is operating and the circuit M being connected in series with a stop push button 236 for deenergizing and disconnecting the clutch 228.

Below the electrode heads 44, 46 and in electrical contact therewith are liquid contacts 194, 196 that take the place of the conventional bus bars. These liquid contacts 194, 196 are respectively mounted upon and electrically connected to the secondary poles or terminals 198, 200 of a transformer 202 that is fixedly mounted on and insulated from the base plate 14. The transformer is centrally disposed with respect to the electrode heads when the movable electrode head 46 is at its outermost position for maximum size pipe.

The liquid contacts 194, 196 respectively include pans or troughs 204, 206 that are made from a suitable metal such as heavy cast copper and a current conducting liquid such as mercury. The quantity of mercury in each trough is sufficient to provide an extensive electrical contact with the peripheries of the electrode housings. It will be observed that the trough 206 is formed with a hollow of greater length than that of the trough 204 in order not to interfere with the travel of the electrode head 46 in a longitudinal plane, and that the hollows of both troughs will be such as to permit unrestrained rotation of the heads in their respective transverse planes. The troughs are electrically connected to the secondary poles at the innermost portions thereof to provide for the maximum transfer of current from the transformer to the electrode heads.

The liquid electrical contact area with each of the electrode heads is increased by forming the housing thereof with annular fins 208. The level of the liquid in the pans is determined by the overflow pipes 210. In eliminating the use of bus bars with this arrangement a secondary welding circuit of minimum length is obtainable for every position of the movable electrode head in its travel towards the fixed head.

As already noted, in order to obtain good electrical contact between the interface of each of the electrode inserts of each electrode head and the corresponding contacting areas of the pipe sections as well as to keep the electrodes cool at such contacting areas and to reduce the current path through the housing to the contacting areas of the work to a minimum a current conducting liquid circulating system is provided for each electrode head. Each of said systems consist of a source of supply 238 and a motor driven gear pump 240 for forcing the mercury thru the pipe 242 and flexible tube 244 into the trunnion manifold 58 from which the mercury is distributed thru the three conduits 116 and thence thru a passage 246 formed in the carrier and thru a passage 248 formed in the insert and finally into the troughs or recesses 102.

The conduits 116 have a greater cross section than the passages 246 in the electrode carriers, to avoid restriction of the flow of fluid therethrough which otherwise would occur, in the contracted positions of the electrodes, due to irregularities or variations in the diameters of the tube sections being welded together. The current conducting liquid is exhausted from the troughs 102 into the liquid contacts 194, 196 thru passages 250 extending thru the inserts and the carriers the passage 252 in the partition 78 and the passages 254 in the peripheral wall of the housing. It will also be seen that these openings are smaller in cross section than the inlet passage to the trough and therefore under a sufficient pressure head the space between the carrier and the walls and other voids in the path within the housing will be kept filled with the liquid current conductor. This will serve to reduce to a minimum the current path line to the point of electrical contact at the welding end.

As already noted the level of the liquid in each of the liquid contact troughs is established by a conduit 210 through which the overflowing liquid is returned to the reservoir. The high pressure side of the circulating system is shunted to return the liquid to the reservoir when the pressure exceeds the desired value. For this purpose a relief valve 256 is provided in a by-pass channel 258 which serves to maintain the necessary pressure to raise the liquid to the desired elevation and also serves to automatically by-pass the liquid when the pressure is built up beyond the normal circulating pressure which occurs when the electrode elements are expanded to their outermost position closing the ends of the conduits 116 and shutting off the liquid flow, thus increasing the pressure in the circuit. Short circuiting of the electrode heads thru their respective current conducting fluid circuits is avoided by insulating the liquid circulating system that is disposed on the fixed electrode head side of the welding apparatus. Should the liquid in the reservoir or thru the paths be excessively heated then provision may be made for cooling the liquid itself by providing the reservoir with a water cooling system.

Bodily movement of the movable electrode head 46 relative to the fixed electrode head 44 is brought about in a manner and by a construction and arrangement of devices substantially similar to that described in my copending application Ser. No. 3,655, filed January 26, 1935, which may be broadly described as consisting of a mechanism for regulating the relative speed and extent of travel of the combined electrode head and table by the displacement of a piston working in a cylinder to which fluid pressure is admitted at a substantially constant pressure, the pressure applied on one side of the piston being regulated and controlled by liquid regulating means on the other side, the liquid regulating means being automatically responsive to the movement of the table, by devices actuated by but operable independent thereof and by manual means, at will.

Certain variations and improvements in the above referred to means for regulating and controlling the movements of the table are illustrated in this embodiment of my invention.

It will be seen by referring to Figs. 2, 5, 6 and 10 that the power device for actuating the table includes two fluid pressure cylinders 260 which are arranged in parallel relation on opposite sides of the table. The fluid-pressure-cylinders are made integral with the table. Disposed within each of the fluid pressure cylinders is a piston 262 that forms with the cylinder working chambers 264 and 266. Each piston has its shaft or connecting rod connected to the yoke 20 so that relative displacement of the piston in opposite directions in the cylinder will cause the table to move away from or toward the yoke. Pressure fluid is supplied from a source of supply at a substantially constant pressure to the working chambers that are connected in parallel thereto by means of a three way valve 268 that connects either ports 270 or ports 272 to alternately serve as inlet and exhaust ports with changes in the position of the valve 268 to move the electrode head 46 toward or away from the fixed electrode head 44, respectively.

The hydraulic variable resistance means for regulating the movement of table, is, as already noted, similar to that disclosed in my copending application Ser. No. 3,655 and it consists of a cylinder 274 that is integral with the yoke 20 and a piston 276 that is connected by means of a piston rod 278 to the table 22. The piston provides working chambers 280, 282. The table is formed with a recess 284 to receive the cylinder between the pressure cylinders 260. A plurality of by-pass circuits are connected in parallel and across the chambers 280, 282, each by-pass being provided with a control device for regulating the flow of liquid from one side of the piston to the other. The by-pass tubes 286, 288, 290, 292 communicate with conduits 294, 296 which in turn are connected to the chambers 280, 282 respectively and alternately serve as inlet and exhaust conduits depending upon the direction of travel of the table. All the voids and spaces within the cylinder and conduits are filled with liquid.

The by-pass tube 286 is provided with a needle valve 298 for controlling the flow of liquid therethru in response to the movement of the table and as predetermined by a cam 300 that is laterally and longitudinally adjustable relative to the table by means of an adjustable cam plate 302. The by-pass tube 290 has a jogging valve 304 disposed therein for controlling the movement of the table, at will. The by-pass tube 292 is provided with an electro-magnetically controlled butting valve 306 that is operated indirectly by the table and at a predetermined point in the travel thereof. A further electro-magnetically controlled valve 308 is provided in the conduit 294 for limiting the movement of the final movement of the table in the welding operation. A return check valve 310 is provided in the by-pass tube 288 to permit the return of liquid to chamber 282 upon return of the table in the opposite direction. The electrical circuits N, O, P and Q including the corresponding pairs of make and break contacts 312, 314, 316 and 318 associated therewith and controlled by the needle valve 298 and the floating bar 320 are practically identical to that disclosed in my earlier filed above referred to application except that the floating bar is provided with four additional pairs of make and break contacts 322, 324, 326 and 328 that control the opening and closing of circuits R, S, T and V in a manner and for a purpose as hereinafter described.

Figure 2:
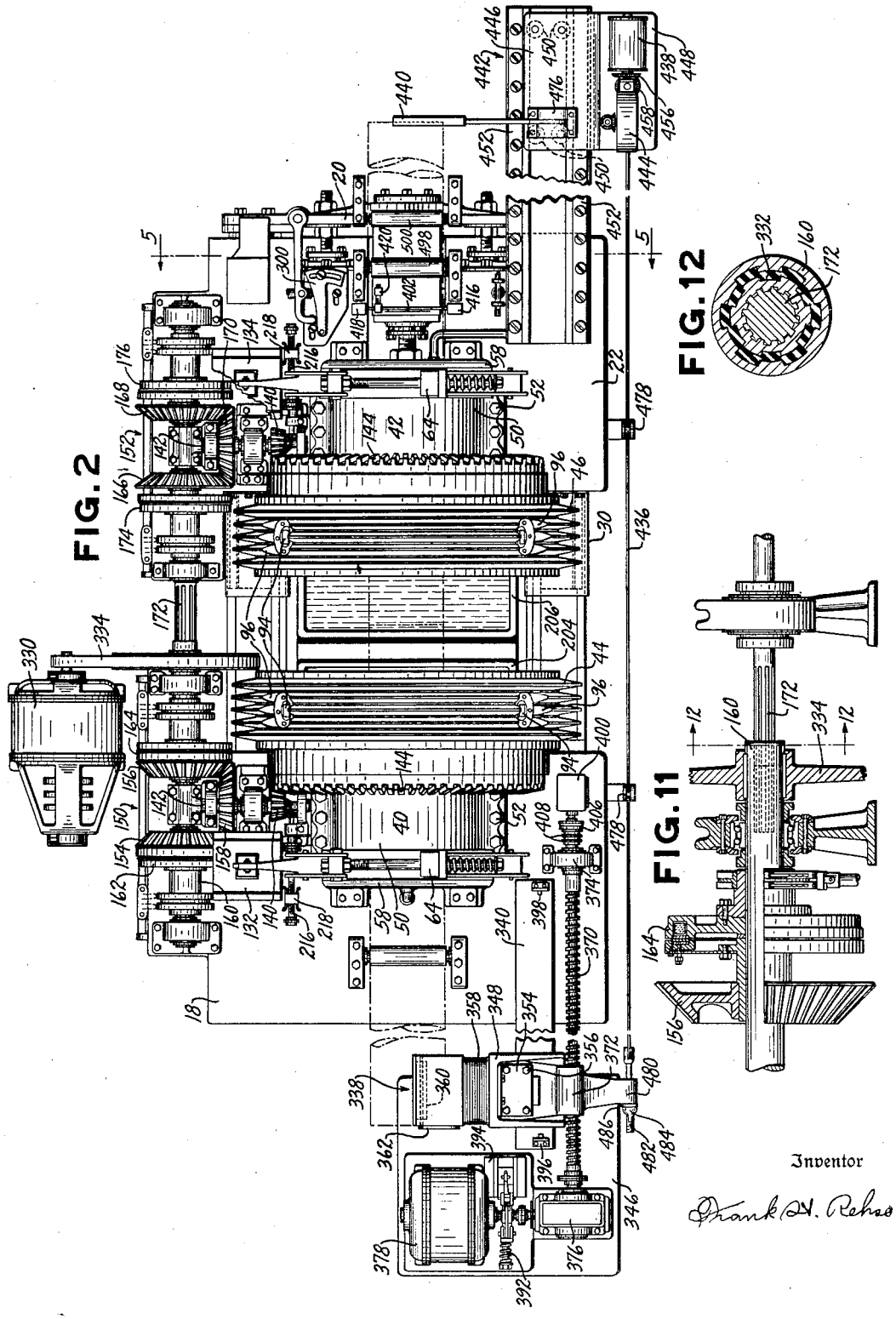
Fig. 2 is a top line view of Fig. 1 including parts of the machine not shown in Fig. 1.

Since it is desired to obtain synchronous rotation of the electrode heads and the pipe sections in the same directions during welding, the reversible driving devices 150 and 152 that are mounted on tables 18 and 22 respectively, as shown in Figs. 2, 11 and 12, are driven by a single variable speed alternating current motor 330 thru the two shafts 160, 172 that are splined together for slideable engagement and insulated from each other by a splined insulating bushing 332. The motor 330 is connected to the female splined drive-shaft 160 through the chain and sprocket drive 334. The speed of the motor may be varied at will by means of a rheostat 336, see Fig. 9. The motor 330 is started and stopped by means of push buttons 335, 337 respectively through a three pole magnetic switch 339 in circuit V.

It will, of course, be understood that the shafts 160 and 172 that drive the reversing mechanism may be separated and individually driven by separate motors or power drives synchronously connected.

The welding apparatus is provided with a work-conveying and positioning device for conveying the work through the electrode head and positioning the end of the work to be welded in a predetermined position between the electrode head automatically. For this purpose and as best shown in Figs. 1, 2, 4 and 9, a power driven magnetic chuck 338 is slideably mounted upon a rail 340 that is bolted at one end to the table and at the other end to a sub-column 342 which, in turn, is mounted upon a bracket 344, that constitutes a part of the support 346. The magnetic chuck consists of a chuck support 348 and a removable chuck member 350. The chuck support is mounted on and slideably connected to the rail by means of gibs 352 on opposite sides of the rail. The chuck constitutes a pole piece that is square shaped at one end to be received within a correspondingly shaped opening in the chuck support and detachably connected thereto by means of a clamp 354 and bolts 356. The other end is formed arcuate to substantially conform to the pipe section carried thereby. The support is further formed with a square shaped recess to receive the energizing coil winding 358 which is suitably insulated from its support. The pipe conforming surface of the chuck is provided with friction reducing rollers 360 and with an end plate 362 that swings into and out of the path of the tube to at times limit the movement of the pipe section by abutting the end thereof and, at other times, to permit its travel past the chuck. Pole pieces having arcuate pipe conforming surfaces of different radii may be interchangeably used in this chuck device for different sizes of pipe sections.

The chuck field coil 358 is preferably excited by direct current supplied from the lines D—C that are common to all of the previously mentioned circuits except A and V. Provision is made for controlling and energization and deenergization of this coil by means of push buttons 364 and 366 respectively. A two-pole magnetic switch 368 of well-known construction is connected in a circuit W for connecting the coil to the line of the direct current supply, the two pole magnetic switch being automatically thrown into and out of circuit by means of said push buttons. The lines connecting the coil are in the form of a flexible cable of suitable length to permit the chuck to move throughout the desired extent of movement thereof.

Travel of the chuck along the rail is accomplished by means of a threaded driving shaft 370 that is threadedly engaged with an internally threaded bronze bushing (not shown) which is press fitted into a bore formed in an arm 372 extending from the chuck support. Suitable means is provided for rotating the threaded driving shaft 370 clockwise and counter-clockwise at desirable speeds for effecting the travel of the magnetic chuck in opposite directions. For this purpose and as illustrated herein, a motor driven reduction gearing mounted upon the supporting column 346 is drivingly connected to the driving shaft which in turn is journaled at one end in a bearing 374 and at the other end in the housing 376.

The motor-driven reduction gear device, as shown, in Figs. 1, 2, 4 and 9 consists of a three-phase constant speed reversing motor 378 that drives a worm 380 which, in turn, meshes with the worm gear 382 fixedly mounted on the worm gear shaft 370. Current is supplied to the motor from a three-phase source of supply and the circuit connecting the motor to the three-phase source of supply includes a three-phase reversing magnetic switch 384 that is remotely controlled by means of buttons 386, 388 and 390 for respectively driving the motor clockwise to actuate the magnetic chuck towards the electrode head, driving the same counter-clockwise to actuate the magnetic chuck away from the electrode head and to interrupt and stop the motor through a magnetic brake device 392, the energizing coil 394 of which is connected between the motor 378 and the load terminals of switch 384 to keep the brake open while the motor is running.

Provision is made to prevent overtravel of the chuck in either direction. For this purpose, travel-limit switches 396, 398 are arranged in the path of travel of the chuck and connected in series with the stop button 390 that breaks the electrical circuit of the motor so that these travel limit switches serve to interrupt the circuit when contacted by the chuck. These stop switches are shown as mounted at the opposite ends of the rail 340.

The means for positioning the welding end of the tube section midway between the electrode heads and substantially centrally of the welding transformer consists of a device for limiting the travel of the pipe through the electrode heads and a means for starting and stopping said device and its associated operated mechanism after the work passes over a predetermined reference point. For this purpose and as illustrated herein, the limiting device operates as a function of the rate of travel of the work to determine the positioning of the work. Within certain limits it is desirable that the point of weld corresponding to the position of highest resistance in the secondary circuit be located substantially at the electrical mid-point of the secondary circuit. This is accomplished by starting the position control or limiting device into operation instantly when the trailing end of the pipe passes over a reference point on the table of the movable head.

It is preferable that the starting of the control device be accomplished automatically and for this purpose a means is provided which is automatically controlled by the work as it passes over the point of reference. Any suitable control means can be used for measuring off a predetermined distance of travel of the pipe after it passes the point of reference. With a constant speed drive for the conveyor a timing device may be employed for stopping the operation of the chuck drive at the end of a predetermined time interval after passing over the reference point. However, as illustrated herein and best shown in Figs. 1, 2 and 9 a control device 400 in the nature of a distance measuring apparatus is associated with the motor drive 378 which actuates the chuck, for measuring off a distance of travel of the chuck corresponding to the desired distance of travel of the trailing end of the tube after it passes the point of reference 402 and then immediately stopping the operation of the drive. The control device, as illustrated herein, is a rotary circuit breaker of the general type of well known construction. The disc 404 of this circuit breaker is calibrated in accordance with the pitch of the drive with which it is associated so that for each rotation of the disc the drive will automatically be shut off. The rotary switch is connected to the threaded driving shaft 370 by means of an electro-magnetic clutch 406 which, in turn, may be manually or automatically controlled.

Current for exciting the coil of the magnetic clutch is supplied from the D. C. lines through the collector rings 408 and thence to the field-winding (not shown) of the clutch. As illustrated, this clutch circuit is opened and closed by means of a trip switch 410 that is automatically controlled by the work as the leading and trailing ends of the individual pipe sections engage and leave a gate 412 mounted upon a shaft 414 which, in turn, is supported in bearings 416 and 418. A weighted member 420 is provided to swing the gate into vertical position as the end of the tube leaves the gate and at the same time bring the metal portion 422 into contact with the switch fingers 424 to make the circuit. When the leading end of the pipe engages the gate it deflects the same and rotates the member breaking this circuit. It will be observed that the control unit 400 is connected to the motor drive through contacts 426 and 428 which are connected electrically in series with the stop button 390 so that when the notch 430 comes into the position of the projection 432 these contacts will separate, breaking the circuit and stopping the motor through the brake 392. For purposes of unloading the welded pipe sections the control device may be disconnected from the motor by means of a single pole switch 434 which shuts out the contacts 426, 428.

Figure 3:
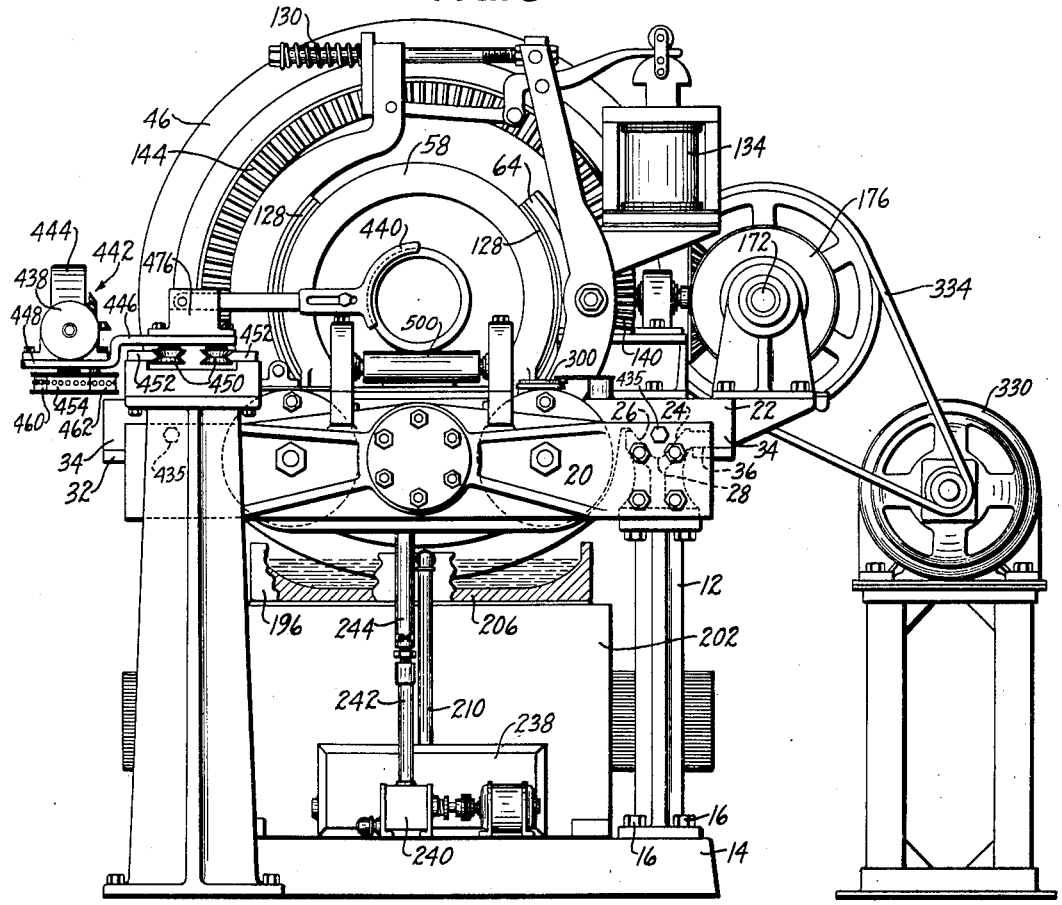
Fig. 3 is an end view of the machine showing Fig. 1 looking from right to left.

Since it is desirable to position the welding end of the tube midway between the electrode head and since the mid position varies with the size and nature of the tube, it becomes important to limit the outward travel of the moving table to a predetermined extent which is determined by experiment in order to insure that after the trailing end of the first pipe leaves the gate 412 and travels a predetermined distance the trailing end will assume the mid-point position between the electrode head. For this purpose and as shown in Fig. 3 adjustable stop screws 435 are provided. These screws pass through and engage with the table projections 28. This determines the maximum spaced distances between the electrode heads and by adjusting the gate length the end of the travel of the pipe terminates at the mid-point of such predetermined distance between the electrode heads.

Means is provided for indicating at all times the length of the pipe sections in the welding apparatus so that the length of pipe consumed in making the individual welds is thereby determined and the length of the final pipe section required to meet a specified finished length can readily be determined.

For this purpose and as illustrated in this embodiment and best shown in Figs. 2, 3, 10, 13 and 14 there is provided a measuring apparatus comprising an extensible element in the form of a tape 436 and a self propelled winding and unwinding device 438 to take up and pay out the tape with corresponding changes in the pipe length. Automatic and continuous pipe length change indications are obtained during welding by associating the free end of the tape with one of the outer ends of the pipe sections and the take up and pay out device with the other through displaceable members. The gate or end plate 362 serves as one of the displaceable members at the discharge end of the welding apparatus and a swingable arm 440 pivotally mounted on a floating carriage 442 for supporting the self propelled device, serves as the other displaceable member.

The carriage consists of a Z-shaped member, the arms 446, 448 of which are disposed in horizontal planes at different elevations to support the pivoted engaging member 440 and the power take-up and pay out device 438. The supporting arm 446 has two pairs of rollers 450 depending from the bottom thereof and disposed between guide rails 452 for supporting and guiding the carriage. The power take-up device is drivingly connected to a reel 454 through right angle gears 456, 458. The reel 454 has wound thereon the measuring tape of sufficient length to accommodate the maximum size of pipe length for which the apparatus is suitable. The tape is provided with perforations that are adapted to receive teeth formed on a sprocket wheel 460 which drives the indicating device 444. The tape passes in front of the reel and in back of the roller 460 and between it and a guide roll 462. The guide roll is provided with perforations to receive the sprocket teeth of the roller 460 as they pass through the opening in the tape. This will insure retaining of the tape on the wheel and thereby obtain accurate measurement. The base circumference of the sprocket wheel is machined to a desired unit of measure and the indicating device is calibrated accordingly. The indicator may be of any well-known construction and, as shown, is provided with two dials 464, 466 and two pointers 468, 470 that respectively indicate the unit of measure in feet and inches, the inch scale or dial being divided into fractions of an inch. The pointers are interconnected to a gear train 472 in such a manner that for each rotation of the smaller pointer, the larger pointer will move one unit. The train gear, in turn, is, of course, connected with the shaft 474 upon which the sprocket measuring wheel is mounted. The extensible tape itself may serve to indicate the combined length of pipe sections by providing a tape that is calibrated in feet, inches and fractions of an inch.

The power take-up device is a series-spring-motor which is designed to have sufficient power not only to take up the slack in the tape but to overcome the friction of the carriage and cause the carriage to move and maintain the engaging or displaceable arm 440 in engagement with the end of the tube. The engaging arm 440 is pivotally mounted upon a support or trunnion 476 which is, in turn, mounted on the supporting plate 446. The arm 440 is angular in cross-section as shown in Figs. 2 and 3 to conform with the peripheral surface of the tube and to overlap the edge portion partially. Guide rolls 478 are provided at spaced points along the length of the tape for maintaining the tape straight.

At the discharge end of the apparatus, the tape end is connected to an arm 480 that is made integral with the chuck carriage or support, the tape being insulated from the arm by an insulating sleeve (not shown). The insulating sleeve is formed with a square bore for a portion of its length to receive in fixed relation a correspondingly shaped portion of an adjustable screw 482 that serves to compensate for expansion or contraction of the tape due to such causes as variations in temperature. The screw is adjusted by means of a wing-nut 484 which bears against an insulating washer 486.

Since the displaceable members, 362, 440 in accordance with this embodiment, can not be brought together, it becomes necessary to initially adjust the indicating hands to indicate a predetermined length which corresponds to the distance between the engaging members at their maximum point of approach relative to each other. It will be seen that this maximum point of permissible travel of the carriage 442 and the chuck 338 is to the manifolds 58.

Each of the dials 464 and 466 are grooved to receive insulated continuous rings of insulated material provided with adjustable contacts 488, 490. These rings are held in place by means of edge screws which are capable of being loosened to permit a rotation of the ring in that way adjusting the position of the contacts. The pointers are constructed from conducting material and are interconnected electrically through a spring washer 492 so that when the pointers are simultaneously in contact with the contacts 488 and 490 a circuit W, will, when the circuit O is shunted out by means of a single pole double throw switch 494, energize the field coil of the electro-magnet 496 to connect the floating bar to the table.

The welding apparatus illustrated herein is suitable for the welding of cast-iron pipe sections and when utilized for this purpose the operation is as follows:

In carrying out the operation, a standard section of cast-iron pipe ranging from about five to six feet in length is placed upon the rollers 498 and 500 and as the leading end of the pipe moves into engagement with and tilts the gate 412 the switch 410 is opened breaking the circuit in order to permit uninterrupted travel of the chuck 338 which has previously been set into motion by pressing the button 386 until the chuck head contacts with the stop switch 398, which determines the limit of the inward travel of the chuck head. This circuit X may be manually closed by switch 415. As the pipe section is passed through the electrode heads 44 and 46, it will pass into contact with the stop plate 362 mounted on the chuck. At this point the chuck is magnetically energized to firmly hold the pipe section in engagement therewith and the push button 386 is operated to cause the chuck to travel outwardly carrying with it the pipe section until the trailing end of the pipe section leaves the gate 412 whence the gate swings upwardly and automatically re-establishes the circuit X to thereby energize the clutch 406. This clutch couples the switch drive to the chuck drive and determines the length of the travel of the chuck by breaking the circuit Y stopping the motor 378 that operates the chuck at the end of a predetermined distance of travel and thus locate the trailing end of the pipe in a predetermined position with respect to and between the electrode heads.

Another tube section is passed over the rolls against the gate 412, depressing the same to break the circuit, and is passed through the electrode head until it engages with the trailing end of the first inserted tube section. At this time the push buttons 502 and 504 are operated to energize the left and right main clutches 148 for coupling the bevel gears 144 to the ring gears 82 respectively.

The left and right electro-magnetic clutches 228 are now energized by operating push buttons 506, 508 to couple the travel limit switches 212, 214 with the reversible driving devices 150, 152 and the push buttons 182, 184 are operated to cause the clutches 162, 176 of the reversible driving devices to engage the beveled driving gears 154, 168 and thereby simultaneously drive the driving screws 216 of the travel limit switches 212, 214 and the ring gears 82 of the contractible and expansible electrode devices in a clockwise direction (looking from left to right in Fig. 4) to contract the electrode segments of each electrode head until the pipe sections are firmly clamped in place, whence the traveling nuts 218 and the tripping arms 220 which were actuated a predetermined distance corresponding to the distance traveled by the electrode segments will momentarily break their respective clutch circuits K, M deenergizing the travel limit clutches 228 and also through arms 222 momentarily break the circuits J, L and thereby deenergize the reversible driving clutches 162, 176. With the electrode segments in clamped position the liquid current conductor is now permitted to circulate from the sources of supply through the manifolds and electrode heads to the liquid contacts and thence back to the reservoir.

In carrying out the process of welding cast iron sections with the present apparatus, the relative rate of travel between the electrode heads in advancing the movable head toward the fixed head and the required extent of travel will vary with different materials or with the same material having different properties and for each kind of metal the rate and extent of travel will be empirically determined and the welding apparatus will be adjusted accordingly and as described more in particular in my above referred to application.

Prior to advancing the movable electrode head for purposes of making the weld, the engaging member 440 of the measuring apparatus is swung over and is maintained in engagement with the trailing end of the tube by the tensioned tape and the contacts 488, 490 are set to a position corresponding to a specified or desired length of multiple welded tubing and the coils 132, 134 are energized to open the brakes 64 by closing circuits C, D by means of push buttons 507, 509. Predetermined values of welding current voltage is selected by means of selective switches 510, 512, 514 connected across the supply circuit Z. The electro-magnetic brakes 64 are now released to permit rotation of the electrode heads 44, 46.

During the first part of the first "flashing off" operation the electrode heads are caused to rotate relative to one another by deenergizing either of circuits C, D thru either push buttons 511 or 513 respectively. As uneven projections of the pipe are brought into contact during relative rotational and longitudinal movement thereof, flashing of the metal at the contacting areas of the metal takes place thereby removing these projections until the opposing surfaces of the adjoining edges are in parallel planes or lie in a plane substantially at right angles to the axis of rotation of said heads.

Should the heated metal edges during the first "flashing off" step and while said heads are relatively rotating indicate any irregularities in the progressive heating thereof, primarily because of unequal resistances of directly opposing metal portions, then such portions of the metal edges of the tube which respectively indicate maximum temperature values will be positioned directly opposite to each other by controlling the relative rotation of said electrode heads and when the heated portions of substantially equal values is properly aligned the relative rotation of said heads is stopped which may correspond approximately to the time when the pipe ends are brought together to close the secondary circuit for the purpose of "preheating."

Should the heated metal edges, during the "preheating" period indicate further irregularities in the progressive heating from the point of contact towards the electrode heads which may result from unequal resistances and unequal areas of contact of the abutting edges or from unequal current path lengths thru such contacting areas of the metal in the welding circuit, the electrode heads will be rotated simultaneously together until they arrive at a point where the resistances for all points of contact along the abutting edges are substantially equal.

Unequal resistances at the contacting areas due to unequal wall thickness of pipe sections will produce relatively large temperature differences, whereas unequal current path lengths will produce relatively small temperature differences. In order, therefore, to establish substantially equal resistance effects throughout the circumferential contact of the pipe edges the electrode heads are rotated together relative to the source of potential to vary the position of the work relative to the current path lines to an extent depending upon which of these conditions predominate, which is determinable by observation.

If the irregularity in the circumferential temperature results from unequal current path lengths, then the desired distribution of the current flow thru each portion will be obtained by rotating the electrode heads in unison at a predetermined speed. In so doing the sum of the current flows thru each portion during each cycle of rotation will be substantially equal. It will be understood that the speed of rotation of the electrode heads will be made to correspond to the rate of change of temperature in the metal with respect to time as will be determined from the average temperature gradient for a given metal and voltage.

During the second "flashing off" operation which takes place after the step of preheating the electrode heads are again caused to rotate relative to one another preferably at a substantially constant low speed to maintain the contacting surface of the adjoining edges of the pipe sections in parallel planes. This relative rotation commences substantially with the separation of the electrode heads for establishing the electric arc and continues until the molten or fused edges are brought together or shortly thereafter and while the metal edges are still molten to cause grain growth of the metal at the joint.

Substantially at the same time that the welding current is interrupted by means of the floating bar 320 separating contacts 318 the floating bar also serves to separate contacts 322 and thereby de-energize the main magnetic clutches; to separate contacts 324 and thereby de-energize coil 132, 134 and apply the brakes to stop the rotation of the electrode heads; and to de-energize coil 516 and energize coil 518 by respectively separating contacts 326 and connecting contacts 328 thereby preventing the flow of liquid from chamber 282 to chamber 280 and abruptly decelerating the bodily travel of the movable electrode head. The operation of the brakes 64 through the floating bar 320 may be shunted out by a switch 519 in circuit S.

Discharging of the welded pipe sections from the movable electrode head does not take place until after proper cooling of the welded joint and since it is not desirable to release the tube while the joint is being cooled to avoid breakage or setting up of strains at the joint such relative creeping movement between the pipe sections as is necessary to compensate for shrinkage during cooling is effected by the movement of the movable electrode head which is permitted by means of an adjustable by-pass 520 around the stop valve 308.

After the weld is formed and while the metal is still at a high degree of temperature inner and outer scraping tools conforming to the inner and outer surfaces are applied to the inner and outer seams respectively and the electrode heads are simultaneously rotated together in the same direction causing by the use of such tools the removal of excess metal.

The welded pipe is now ready to be removed from the movable electrode head for positioning the pipe trailing end for the next weld by expanding the electrode elements of the contractable and expansible electrode devices of both electrode heads by operating push buttons 184, 190 and energizing the reversible driving clutches 164, 174 while the travel limit switches are again rendered operatively connected with the reversible driving devices for governing the expanding travel of the electrode segments, and then actuating the chuck carriage by means of the motor 378. If it is desired to completely remove the welded pipe from the welding apparatus then the automatic position controlling device 400 is shunted out of operation by switch 434 in order to permit the desired travel of the chuck.

When the last of the multiple pipe sections is being welded circuit W including contact 488, 490 is switched in and circuit Q is switched out by means of switch 494 so that the pointers 468, 470 control the energization of the floating bar 320 when they are simultaneously in contact with contacts 488, 490.

The return of the electrode head to the starting position for producing another weld will cause the floating bar magnetic coil 496 to be de-energized and the spring 522 will return the bar to its normal position and thereby reestablish the starting position for the various contacts carried thereby.

While I have described my invention with reference to specific apparatus and the specific application to and specific method of welding, it is to be understood that many modifications and applications of it may be made without departing from the spirit or scope of the appended claims.

What I claim as new and desire to secure by Letters Patent is:

1. In an electric resistance welding apparatus comprising in combination, a pair of work supporting and electric contacting devices, means for actuating said devices relatively towards and away from one another for effecting a weld, means responsive to the movement of at least one of said devices to indicate the relative extent of travel of said devices during the welding operation and means associated with said indicating means and with said device actuating means to stop the movement of said devices towards each other at the end of a predetermined distance of travel thereof.

2. In an electric resistance welding apparatus comprising in combination, a pair of work supporting and electric contacting devices, means for actuating said devices relatively toward and away from each other, a stop control device, means for indicating the relative extent of travel of said devices during the welding operation, and means associated with said indicating means to render said control device effective to stop the movement of said devices at the end of a predetermined distance of travel thereof.

3. In an electric resistance welding apparatus comprising in combination, a pair of work supporting electrode heads, fluid pressure means operating at all times under maximum pressure to actuate one of said electrode heads, means for resisting the movement of said actuated head, an electro-magnetically operated device for controlling said resisting means, an electric circuit for energizing said electro-magnet and means for indicating the relative extent of travel of said heads, during the welding operation and for closing said circuit after a predetermined extent of relative travel of said heads to render said control device effective.

4. In an electric resistance welding apparatus comprising in combination, a pair of work supporting electrode heads, means for actuating said heads relatively towards and away from one another for effecting a weld, means for moving the welded work relative to said heads and a measuring device operatively responsive to the relative movement of said heads and to the relative movement of the welded work and heads for indicating, respectively, the extent of variation in dimension of the work being measured, while forming the weld, and the overall length of the work being measured.

5. In an electric resistance welding apparatus comprising, in combination, a pair of work supporting electrode heads, means for actuating said electrode heads relatively towards and away from one another for effecting a weld, means for moving the welded work relative to said electrode head and a measuring device including a variably extensible member and a member to take up and pay out said extensible member, one of said members being movable in response to the movement of the welded work, the other of said members being movable in response to the relative movement of said electrode heads.

6. In an electric welding machine in combination, a member for effecting electrical contact and rotatable with one of the work pieces to be welded, said member comprising a support having an axial opening to receive the work piece, a plurality of electrodes mounted on said support and connected for equal simultaneous movement toward and away from the axial line of the work piece to clamp and release the work piece, respectively, each electrode having the operative portion thereof provided with a trough and means associated with each trough to provide an electrically conducting liquid in contact with the work piece during the rotational movement of said member.

7. In an electric welding machine in combination, a relatively stationary member, a rotary member mounted on said stationary member for effecting electrical contact with one of the work pieces to be welded, means for releasably locking said rotary member against rotation, said rotary member comprising a support having an axial opening to receive the work, one or more electrodes mounted on said support and movable to and from the axial line of the work and a common means for moving said electrode or electrodes to first clamp the work when said rotary member is in locked condition and to thereafter rotate said rotary member when in released condition.

8. In an electric welding machine in combination, a rotary member for effecting electrical contact with one of the work pieces to be welded including electrode means for clamping and releasing and means for actuating said clamping means into engagement with the work and to thereafter rotate said member together with the work.

9. In an electric welding machine in combination, a rotary member for effecting electrical contact with one of the work pieces to be welded, work-clamping and -releasing means carried by said member, power means for moving said last mentioned means into and out of contact with the work and for rotating said member and means operatively associated with said power means to prevent power movement of said clamping and releasing means after a predetermined extent of clamping or releasing movement thereof.

10. In an electric welding apparatus in combination, a movable support a member rotatably mounted on said support for effecting electrical contact with a work piece to be welded, electrode work-clamping and -releasing means carried by said rotatable member, means for moving said electrode to clamp the work and to thereafter rotate the same together with said rotatable member comprising driven means carried by said rotatable member and driving means carried by said movable support and means for moving said support longitudinally during welding.

11. In an electric welding apparatus, in combination, a transformer secondary, a pair of work supporting devices movable relatively towards and away from one another and angularly about a common axis and having openings concentric with said axis for receiving the work pieces, means associated with at least one of said devices for effecting either or both of said movements and electrically insulated means for supplying an electrically conducting liquid between said angularly movable device and the correspondingly supported work piece for effecting good electrical contact therebetween in any moved position of said devices.

12. In an electric welding apparatus in combination, a transformer secondary, a pair of work supporting devices movable relatively towards and away from one another and angularly about a common axis and having openings concentric with said axis for receiving the work pieces, means associated with at least one of said devices for effecting either or both of said movements and separate electrically insulated means for supplying an electrically conducting liquid between each of said devices and their correspondingly supported work pieces for effecting good electrical contact therebetween in any moved position of said devices.

13. In an electric welding apparatus in combination, a pair of work supporting devices relatively movable towards and away from one another for effecting the weld, at least one of said devices being rotatably movable about an axis common to both devices, means associated with said devices for effecting both said linear and angular movements independently of one another and means operative in response to one of said movements for controlling the other.

14. In an electric welding apparatus in combination, a pair of work supporting devices relatively rotatable and relatively movable towards and away from one another, for effecting the weld, a plurality of actuating means associated with said devices for effecting said linear and rotatable movements independently of one another, and means operatively associated with one of said actuating means for controlling the operation of the other.

15. In an electric welding apparatus in combination, a pair of work supporting devices relatively movable towards and away from one another, both said devices being angularly movable about a common axis independently, and either successively or simultaneously, power actuating means associated with said devices for effecting either or both of said linear and angular movements, and means operative in response to one of said movements for controlling the other of said movements.

16. In an electric welding apparatus in combination, a pair of rotatable electrode devices movable relatively towards and from each other for effecting the weld, each device having an axial opening to receive a work piece to be welded and provided with a plurality of radially movable electrodes for effecting circumferential electrical contact with the work piece, power actuated reversible means for rotating said devices independently, and either successively or simultaneously, to vary the effects on said work pieces of the current flowing thru said devices and said work pieces and means responsible to one of said movements, for controlling the other of said movements.

17. In an electric welding machine in combination, a pair of supports relatively movable towards and from one another, a pair of work electric contacting and supporting devices carried by said supports, said devices being rotatably mounted on their corresponding supports, power means for actuating one of said supports and power means operatively connected to said rotatable devices to actuate the same individually or in unison and independently of the movement of said movable support.

18. In an electric welding machine in combination, a pair of supports relatively movable towards and from one another, a work supporting device carried by each of said supports, each of said devices being rotatably mounted and having electrode work-clamping and -releasing means, power means for effecting the relative movement of said supports and further power means to actuate, at least, one of said clamping and releasing means to clamp the work and rotate the same with the corresponding device.

19. In an electric welding machine in combination, a pair of supports relatively movable towards and from one another, a rotatable work supporting device carried by each of said supports, means to prevent at will, the rotation of said devices, each of said devices being provided with a plurality of electrodes connected for equal simultaneous movement to and from the axial line the work and power means for actuating the electrodes of one of said devices to clamp the work when said device is held against rotation and to rotate said device when released.

20. In an electric welding machine in combination, a pair of supports relatively movable towards and from one another, a rotatable work supporting device carried by each of said supports, means to prevent at will, the rotation of said devices, each of said devices being provided with a plurality of electrodes connected for equal simultaneous movement to and from the axial line of the work and variable speed means for actuating, at will, the electrodes of either or both of said devices when held against rotation and for rotating said devices with the work when released.

21. In an electric welding machine in combination, a pair of supports relatively movable towards and from one another, a rotatable work supporting device carried by each of said supports, means to prevent at will, the rotation of said devices, each of said devices being provided with a plurality of electrodes connected for equal simultaneous movement to and from the axial line of the work and variable speed means for actuating, at will, the electrodes of either or both of said devices when held against rotation and for rotating said devices with the work when released, said variable speed means including a driving member carried by each of said supports a driven member carried by each of said devices and motor driven reversible means for actuating each of said driving members in one direction to actuate the electrode to clamp the work and then rotate said device and work or in the opposite direction to release the work.

22. In an electric welding apparatus adapted to butt weld the edges of two pieces of work while moving said work pieces relatively towards one another, in combination, a welding transformer secondary, a pair of rotary electrode devices for supporting and clamping the work pieces respectively said devices being electrically connected with the terminals of said transformer secondary and means for rotating said devices together, at will, about a common axis in the plane of said relative movement and during welding to thereby obtain substantially an average minimum current path throughout the contacting areas of the abutting edges.

23. In an electric welding apparatus adapted to butt weld the edges of two pieces of work while moving said work pieces relatively towards one another, in combination, a welding transformer secondary, a pair of rotary electrode devices for supporting and clamping the work pieces respectively said devices being electrically connected with the terminals of said transformer secondary and means for rotating said devices relatively or together at suitable speeds at will, about a common axis in the plane of said relative movement and during welding to thereby obtain substantially an average uniform distribution of current throughout the contacting areas of the abutting edges.

24. In an electric welding apparatus adapted to butt weld the edges of two pieces of work while moving said work pieces relatively towards one another, in combination, a welding transformer secondary, a pair of electrode devices for effecting electrical contact and supporting the work pieces, respectively, and means for rotating one of said work pieces relative to the other, at will, about a common axis in the plane of said relative movement and during welding to thereby flash off the faces of the abutting edges into parallelism and obtain during such relative rotation an average uniform distribution of current throughout the areas of the adjoining faces.

25. In an electric welding apparatus in combination, a welding transformer secondary, a container electrically connected with a terminal of said secondary, a rotatable electrode device having an axial opening to electrically contactually receive therein the work piece to be welded, said opening being formed to provide with the contacting surface of the work piece a substantially enclosed hollow and means for supplying an electrically conducting liquid to said container and to said hollow for transferring current to the work piece thru said electrode device in any rotated position thereof.

26. In an electric welding apparatus in combination, a welding transformer secondary, having a terminal provided with a hollow, a rotatable electrode device having an axial opening to electrically contactually receive therein the work piece to be welded and to provide with the contacting surface thereof a substantially enclosed hollow at its inner peripheral portion and having its outer peripheral portion disposed within said terminal hollow, an electrically conducting liquid provided between said terminal and said outer peripheral portion, means for supplying the electrically conducting liquid between said inner peripheral portion and the corresponding surface of the work piece in any rotated position of said electrode device and means for rotating said electrode device to vary the effects on the work piece of the transmitted current.

27. In an electric welding apparatus in combination, means for transferring welding current from a transformer secondary terminal to a piece of work to be welded comprising a container, a rotatable work support mounted in the container and having an axial opening to receive the work piece, work clamping and releasing electrodes carried by said support, said electrodes having the operative portion provided with troughs and means for supplying an electrically conducting liquid in the container and in each trough when said electrodes are in clamped engagement with the work piece and in any rotated position of said support for transferring electric current from said container to said work support and from said electrode to the work piece.

28. In an electric welding apparatus in combination, a welding transformer secondary circuit, a pair of electrode devices for effecting electrical contact and supporting the work pieces, respectively, a pair of containers associated with said electrode devices respectively to receive current from the terminals of the transformer secondary and liquid metal in said containers to transfer current from said containers to their corresponding electrode devices and means for rotating one of said work pieces relative to the other about a common axis a sufficient amount to reduce to a minimum the difference in resistance to current flow through the different portions of the work and further means for rotating both pieces of work, in unison, to obtain during welding an average uniform current path length through the different portions of the work pieces.

29. In an electric welding apparatus, in combination, a welding transformer secondary, a pair of rotatable electrode devices for effecting electrical contact and supporting the work pieces respectively, means for rotating one of the work pieces relative to the other about a common axis a sufficient amount to reduce to a minimum the difference in resistance to current flow through the different portions of the work and further means for rotating both pieces of work in unison to obtain during welding an average uniform current path length through the different portions of the work pieces.

30. In an electric welding apparatus adapted to butt weld the edges of two pieces of work while moving said work pieces relatively towards one another at predetermined speeds in combination, a welding transformer-secondary, a pair of relatively rotatable electrode devices for effecting electrical contact and supporting said work pieces respectively, variable speed means for rotating one work piece relative to the other with increasing or decreasing speeds corresponding to an increase or decrease in the speed of said relative movement toward one another of said work pieces.

31. In an electric welding apparatus adapted to butt weld the edges of two pieces of work while moving said work pieces relatively towards one another at predetermined speeds and for a predetermined extent in combination, a welding transformer secondary, a pair of relatively rotatable electrode devices for effecting electrical contact and supporting said work pieces respectively, variable speed means for rotating one work piece relative to the other with increasing or decreasing speeds corresponding to an increase or decrease in the speed of said relative movement toward one or the other of said work pieces and means for automatically stopping said rotational movement substantially at the end of said first mentioned predetermined movement.

32. In an electric resistance welding machine in combination, means for effecting electrical contact with a piece of work to be welded comprising a hollow support having inlet and outlet ports adapted to receive and exhaust a circulating fluid current conductor, a movable electrode carried by said support for clamping and releasing the work piece, said electrode serving to shut off said inlet port in the releasing position thereof and open the same in the clamping position.

33. In an electric resistance welding machine in combination, means for effecting electrical contact with a piece of work to be welded comprising a hollow support having inlet and outlet ports, a movable electrode mounted on said support and having at its operative portion a trough to receive a liquid metal said electrode serving in the contact position to establish communication with said inlet port and in the released position to shut off same.

34. In an electric resistance welding machine in combination, means for effecting electrical contact with a piece of work to be welded, comprising a support having a plurality of radially arranged chambers, each chamber having inlet and outlet ports, a corresponding plurality of electrodes mounted in said chambers and connected for equal simultaneous movement to and from the axial line of the work piece, each electrode having a passage in communicaion with said ports and means for circulating a liquid current conductor through said chambers.

35. In an electric resistance welding machine in combination, means for effecting electrical contact with a piece of work to be welded, comprising a support having a plurality of radially arranged chambers, each chamber having inlet and outlet ports, a corresponding plurality of electrodes mounted in said chambers and connected for equal simultaneous movement to and from the axial line of the work piece, each electrode having a trough at the operative portion thereof that is in communication with said ports respectively, and means for circulating a liquid current conductor through said troughs.

36. In an electric resistance welding machine in combination, means for effecting electrical contact with a piece of work to be welded comprising a rotary support having a plurality of radially arranged chambers, each chamber being provided with inlet and outlet ports, a corresponding plurality of electrodes mounted in said chambers and connected for equal simultaneous movement to and from the axial line of said work piece, each electrode having a trough at the operative portion thereof that is in communication with said ports respectively and means for circulating a liquid metal through said troughs including an annular manifold in communication with said inlet ports at all times.

37. In an electric welding machine, in combination, means for moving along a path a piece of work to be welded, means for measuring a predetermined extent of travel of said work piece and for thereafter effecting a stoppage of the movement of said work piece and means controlled by said work piece for initiating at a predetermined point along its path the operation of said measuring means.

38. In an electric welding machine in combination, means for moving along a path a piece of work to be welded and means for controlling the operation of said moving means for positioning said work piece in a predetermined position, said controlling means comprising a switch operated by said work piece at a predetermined point in its path of travel and means rendered operative by said switch for rendering said moving means inoperative after a predetermined length of travel of said work piece beyond said predetermined point.

39. In an electric welding machine in combination, means for pulling along a path a piece of work to be welded and means for controlling the operation of said pulling means, said controlling means comprising a device adapted to be operatively connected to and driven by said pulling means for rendering said pulling means inoperative after a predetermined length of travel of said work piece and a switch controlled by said work piece for effecting said connection at a predetermined point of reference along said path of travel.

40. In an electric welding machine in combination, means for pulling along a path a piece of work to be welded and means for controlling the operation of said pulling means, said controlling means comprising a device adapted to be operatively connected to and driven by said pulling means for rendering said pulling means inoperative after a predetermined length of travel of said work piece and a switch controlled by the trailing end of said moving piece for effecting said connection.

41. In an electric welding machine in combination, a pair of electrodes for effecting electrical contact with the work piece, means for causing said piece of work to be moved in a manner to position the end thereof to be treated from one side of one of said electrodes to a predetermined position therebetween comprising means for gripping and moving the work piece and measuring means rendered operative by said work piece at a predetermined point in its travel for limiting the extent of travel of said work beyond said point to a predetermined value.

42. In an electric welding machine in combination, a pair of work electric contacting and supporting devices provided with coaxial openings to receive the work pieces to be welded, means for pulling one of said pieces thru the openings of said devices to position the trailing end thereof between and in predetermined relation to said devices, said means comprising a switch adapted to be connected with said pulling means for rendering the same inoperative after a predetermined length of travel of said work piece and a switch controlled by the trailing end of said moving work piece, for initiating the operation of said first mentioned switch.

43. In an electric welding apparatus, in combination, means for transferring welding current from a transformer-secondary terminal to a piece of work to be welded comprising, a pair of rotatable work-supporting and electric-contacting devices relatively movable towards one another for effecting the weld, each device having an axial opening to receive in electrical contactual relation a work piece, with peripherally arranged interspaces therebetween a pair of liquid containers, each container being disposed between one of said devices and a corresponding terminal of said transformer secondary and means for supplying an electrically conducting liquid to fill said interspaces and said containers to transfer electric current to the work piece at all times during said rotary and linear movements of said devices.

44. In an electric welding apparatus in combination, a welding transformer-secondary circuit which comprises the work pieces to be welded, a pair of electrode devices for effecting electrical contact and supporting the work pieces, respectively, said devices being movable relatively towards each other for effecting the weld, a pair of containers associated with said electrode devices respectively to receive current from the terminals of the transformer secondary and liquid metal in said containers to transfer current from said containers to their corresponding electrode devices and means for rotating one of said work pieces relative to the other about a common axis a sufficient amount to reduce to a minimum the difference in resistance to current flow through the different portions of the work and further means for rotating both pieces of work, in unison, to obtain during welding an average uniform current path length through the different portions of the work pieces.

45. In an electric welding machine in combination, a pair of work-electric contacting and supporting devices having axial openings to receive the work pieces to be welded, said devices being relatively movable towards each other for effecting the weld and means for axially moving one of the pieces of work to be welded to position the trailing end thereof between and in predetermined relation to said devices comprising, power driven means for gripping and moving the same, means adapted to be operatively connected with said power driven means at a predetermined point in said path for limiting said movement to a predetermined length of movement beyond said point and means controlled by said work piece for initiating the operation of said last mentioned means.

46. In an electric resistance welding apparatus comprising, in combination, a pair of work supporting electrode heads, means for actuating said electrode heads relatively towards and away from one another for effecting a weld, means for moving the welded work relative to said electrode head and a measuring device including a variably extensible member and a power driven bodily movable member to take up and pay out said extensible member, one of said members being movable in response to the movement of the welded work, the other of said members being movable in response to the relative movement of said electrode heads.

47. In an electric welding machine in combination, a rotary member, one or more electrodes carried by and movable in a plane normal to the axis of rotation of said member and a common means for actuating said electrode or electrodes into engagement with the work and for thereafter rotating said member.

48. In an electric welding machine in combination, a rotatable support, one or more electrodes supported thereby and movable relative thereto for engagement with the work piece to be welded, means for rotating said support and means associated with said electrode or electrodes to provide an electrically conducting liquid in contact with the work in any rotated position of said support.

49. In an electric resistance welding apparatus having welding means and work feeding means, a switch for controlling the feeding of said work, means for bodily moving the switch with the work and means operative in response to the movement of said switch moving means for controlling said switch.

50. In an electric welding apparatus in combination, a welding transformer secondary, a pair of electrode devices electrically connected to the terminal of said secondary for effecting electrical contact with the work pieces, respectively, and means for rotating both pieces of work, in unison, to obtain during welding an average uniform current path length through the different portions of the work pieces.

51. In an electric welding apparatus in combination, a welding transformer secondary, a pair of electrode devices electrically connected to the terminal of said secondary for effecting electrical contact with the work pieces, respectively, and means for rotating one of said work pieces relative to the other about a common axis a sufficient amount to reduce to a minimum the difference in resistance to current flow through the different portions of the work and further means for rotating both pieces of work, in unison, to obtain during welding an average uniform current path length through the different portions of the work pieces.

FRANK H REHSE.